US007818089B2

(12) United States Patent
Hanna et al.

(10) Patent No.: US 7,818,089 B2
(45) Date of Patent: Oct. 19, 2010

(54) SYSTEM AND METHOD FOR DESIGNING AND PRODUCING CONFECTIONARY ARRANGEMENT

(75) Inventors: Alex A. Hanna, Ooltewah, TN (US); Bruce W. Keen, Mount Bethel, PA (US); Richard J. Barrett, Chattanooga, TN (US)

(73) Assignee: Mars Incorporated, McLean, VA (US)

( * ) Notice: Subject to any disclaimer, the term of this patent is extended or adjusted under 35 U.S.C. 154(b) by 1002 days.

(21) Appl. No.: 11/581,459

(22) Filed: Oct. 17, 2006

(65) Prior Publication Data

US 2007/0110886 A1    May 17, 2007

Related U.S. Application Data

(60) Provisional application No. 60/726,649, filed on Oct. 17, 2005.

(51) Int. Cl.
*G06F 17/00* (2006.01)
(52) U.S. Cl. ............... 700/233; 700/234; 221/24
(58) Field of Classification Search ............ 221/24; 700/233, 234
See application file for complete search history.

(56) References Cited

U.S. PATENT DOCUMENTS

| 3,427,650 | A | * | 2/1969 | Woody | 118/24 |
| 4,910,661 | A | * | 3/1990 | Barth et al. | 700/66 |
| 5,121,677 | A | * | 6/1992 | Le Claire et al. | 99/357 |
| 6,006,946 | A | | 12/1999 | Williams et al. | |
| 7,353,079 | B2 | * | 4/2008 | Rodriguez | 700/233 |
| 2003/0026873 | A1 | | 2/2003 | Collins et al. | |

FOREIGN PATENT DOCUMENTS

| EP | 1 550 375 | 7/2005 |
| JP | 2003-233736 | 8/2003 |

* cited by examiner

*Primary Examiner*—Gene Crawford
*Assistant Examiner*—Timothy R Waggoner
(74) *Attorney, Agent, or Firm*—Fitzpatrick, Cella, Harper & Scinto

(57) ABSTRACT

Confectionary image design system including a graphical user interface through which a user defines a pattern of confectionary pieces to be arranged on a substrate. A computer processor controls the graphical user interface through which the user defines the pattern, and provides instructions for arranging the confectionary pieces in the defined pattern. A container retains the confectionary pieces used to form the defined pattern. A robot receives from the computer processor the instructions for arranging the confectionary pieces, retrieves the confectionary pieces stored in the container, and arranges the pieces on the substrate in the pattern defined by the user.

20 Claims, 4 Drawing Sheets

SYSTEM AND METHOD FOR DESIGNING AND PRODUCING CONFECTIONARY ARRANGEMENT

BACKGROUND OF THE INVENTION

1. Field of the Invention

This invention is directed to a system and method for enabling a user to design a pattern of confectionary pieces to be positioned on a substrate, and arranging the pattern of confectionary pieces in accordance with the design using an automated robot.

2. Related Background

Arranging confectionary pieces, such as small pellet-like confectionary pieces, in a preferred pattern has been achieved by conventional means. There is room, however, for improvements in the methods and systems for achieving this end. In particular, conventional systems typically arrange confectionary pieces in industrial settings in accordance with predetermined designs.

The conventional systems fail to provide a confectionary production system that enables a customer to arrange candy pieces on a substrate in unique patterns. More specifically, these conventional systems fail to enable a customer to design a pattern of confectionary pieces and then automatically construct the final product quickly and easily, to achieve the customer's own design.

SUMMARY OF THE INVENTION

The present invention is directed to a confectionary image design system which (i) allows a user to design a pattern of confectionary pieces through the use of an interface with a computer processor and (ii) automatically arranges corresponding confectionary pieces on a substrate in accordance with the user's design. In particular, the confectionary image design system includes a display adapted to display a graphical user interface through which a user designs a pattern which will define the arrangement of the confectionary pieces on the substrate. A computer processor is adapted to control the graphical user interface through which the user defines the pattern. Further, the computer processor provides instructions for arranging the confectionary pieces in the defined pattern. At least one container retains the confectionary pieces to be used to form the defined pattern. In addition, a robot is provided which includes a robotic production system and a robot controller. The robot controller receives from the computer processor the instructions for arranging the confectionary pieces and controls the robotic production system to retrieve the confectionary pieces stored in the at least one container and to arrange the pieces on the substrate in the pattern defined by the user.

Preferably, the present invention is embodied in a standalone kiosk. The kiosk is preferably one or more proximally located structures (for instance, an interface for user input and an assembly apparatus), which allow the user to design, produce, and pay for the final confectionary product. Consequently, such a kiosk can be placed in a store or other location for automated service of the customer's needs.

Alternatively, a user could design the pattern of confectionary pieces through a web-based program, or other remote access systems, which allows the user to remotely design the product and have the finished product created and finalized at a separate location.

A user may define the pattern of confectionary pieces by selecting points on a grid of the graphical user interface. Thus, a user can design a pattern by selecting which points on the grid are activated. Preferably, there is a one-to-one correspondence with the confectionary pieces on the substrate and the activated grid points in the user display. Thus, the design can be defined by activating points in the desired pattern, which contrast with non-activated points. In more preferred embodiments, however, multiple containers are provided, each of which holds confectionary pieces of a different color. With multiple color options, a user can select colors for the different points on the grid, which colors correspond to the different colors in the containers of the system. The robot can then retrieve (or dispense) the specified colors from the different containers to arrange a pattern defined by contrasting color selections of confectionary pieces, even if all points on the grid are activated.

In another embodiment, the invention is directed to a method of designing and arranging a pattern of confectionary pieces on a substrate. The method includes a step of accepting through a graphical user interface, which allows a customer to define a pattern of confectionary pieces to be arranged on the substrate, data corresponding to the customer-defined pattern. In another step, a computer processor is used to provide instructions based upon the accepted data. In other steps, a robot controller receives the provided computer instructions, and a robotic production system is operated, using the robot controller and in accordance with the computer instructions, to retrieve confectionary pieces stored in the at least one container and to arrange the retrieved confectionary pieces on the substrate in the pattern defined by the customer.

DETAILED DESCRIPTION OF THE INVENTION

Figure 1:
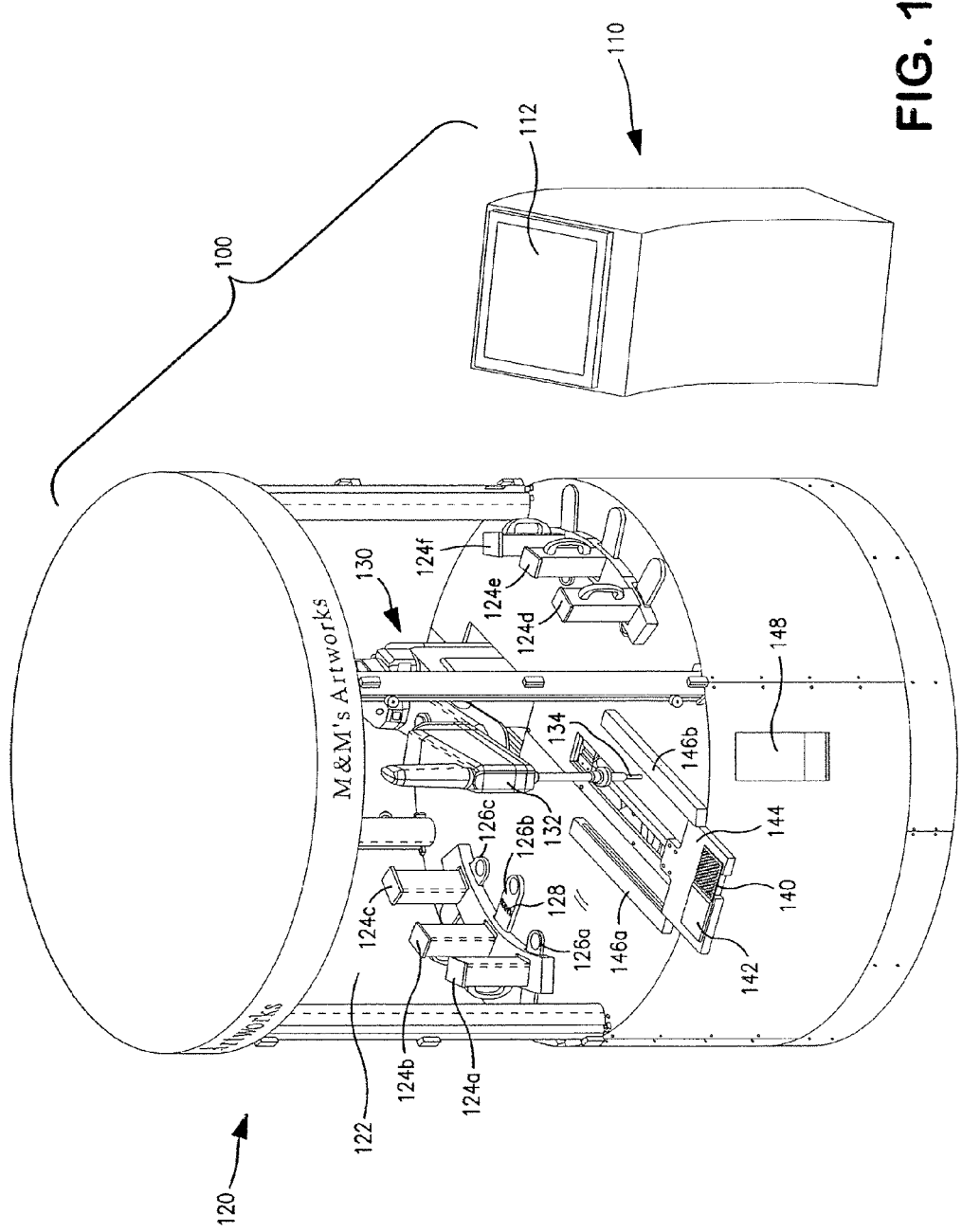
FIG. 1 is a perspective view of a confectionary image design system according to one embodiment of the invention.

FIG. 1 shows a kiosk 100, which includes an interface station 110 and an arrangement area 120. Kiosk 100 forms a confectionary arrangement system according to one embodiment of the present invention. Interface station 110 includes a display 112 for displaying/providing a graphical user interface. Arrangement area 120 is a production system in which a robot 130 arranges confectionary pieces on a substrate 140.

Interface station 110 and arrangement area 120 are two separate structures; however, in other embodiments they may be combined into a single structure. When two separate structures, they may communicate through wired or wireless means. Also, while one interface station 110 is shown in FIG. 1, multiple interface stations 110 may be provided, so that multiple customers may construct their respective designs simultaneously. Further, it should be appreciated that display 112 can be provided remotely, through an Internet connection or the like. In this case, the system will span the network, from the arrangement area 120 to a remote computer such as a user's home computer through which the design information is provided.

Interface

Display 112 of interface station 110 provides a graphical user interface according to a preferred embodiment of the present invention. The user interface may be any one of a number of interfaces which allows a user to provide information indicative of the desired pattern in which the user wants the confectionary pieces to be arranged.

It is also preferred that interface station 110 include a card reader for reading a debit or credit card for payment of the finished product. Alternate payment systems may also be included with interface station 110, such as a currency receiving mechanism (coin or bill). Also, suitable software for operating these systems may also be provided.

In a preferred embodiment, display 112 is a touch screen which a user can operate by touching a finger or implement to different areas of the screen. In other embodiments, a keyboard, mouse, or other data entry systems may be provided to allow a user to provide the requisite information concerning the design.

The user interface may employ a drawing program, many types of which are known by those of skill in the art. Preferably, the selected drawing program will display, on display 112, a grid formed of multiple points. The points on the grid may form a matrix that is, for example, 13×14 or 13×11, in preferred embodiments, although any number of different size grids is possible. Also, the size and layout of the grid may vary depending on the size and layout of the substrate on which the confectionary pieces are to be arranged and the size of the confectionary pieces to be used. Preferred layouts include square, rectangular, square, oblong, etc. The user can select the points by touching the screen so as to activate the displayed points and define a pattern (contrasted by activated verses non-activated points) on the grid. As will be described in more detail later, the robot 130 will arrange the confectionary pieces on the substrate in accordance with the pattern.

There may be a one-to-one correspondence between the activated points on the grid and the confectionary pieces on the substrate (i.e., one activated point on the grid corresponds to one confectionary piece on the substrate). By constructing the user interface in this manner, pixilation of the user design is not necessary, and the one-to-one correspondence provides for a simple programming mechanism. In other embodiments, however, the user may design (or provide, upload, or select) a more complicated picture, which may be converted into pixilated data corresponding to positions at which confectionary pieces are to be placed.

In addition to, or in lieu of, contrasting activated and non-activated points on a grid, it is preferred that the user's pattern be defined by using different colors. Specifically, a user may select a point on the grid and determine which color shall be displayed at that point. Alternatively, the color choice can be made first. Consequently, the robot may retrieve different color confectionary pieces to arrange the pattern on a substrate in a manner corresponding to the defined pattern. In this disclosure, "retrieving" should be interpreted broadly to include "dispensing," unless used in more specific contexts, or otherwise defined.

As will be appreciated by one of ordinary skill in the art, any one of a number of other design/drawing programs may be used to form the user interface, in order to allow the user to design a pattern of confectionary pieces to be positioned on a substrate. In addition, it is also contemplated that the user could design the product by choosing from predetermined patterns, which may be accessed, selected, and potentially modified, through the user interface. Also, the user may upload pictures to the system from an outside source. In such cases, interface station 110 may be provided with an input port for receiving data defining an uploaded image. When a user is accessing the system from a home computer (or other remote location), over the Internet, for instance, the pictures may be taken from the person's hard drive, a data storage CD or DVD, various input ports on the computer, and the like. The uploaded images can then be converted to pixilated data and further edited by the user, if necessary. Further, interface station 110 may be provided with a digital camera, so as to allow a user to take a picture at the kiosk 100, to be converted into a pixilated image forming the confectionary design. A scanner may also be provided, so that a user can scan images to be used in the design. In addition, interface station 110 may be provided with a port or disk drive so that users can upload their own pictures or scanned images from a digital camera, removable flash/jump drive, computer readable disk, or the like.

In this embodiment, interface station 110 may include a computer processor and a computer memory (contained within interface station 110) for operating the software defining the graphical user interface, and processing the user's inputs in order to define and/or provide instructions for operation of robot 130. As would be understood by one of ordinary skill in the art, the precise structure and location of the computer processor and memory are not essential to the operation of the invention. For instance, the computer processor does not have to be located in interface station 110, and can be located in arrangement area 120 or at a remote location such as a user's home, when the information is provided through an Internet portal. The computer processor serves as a controller for operating the graphical user interface and providing instructions commensurate with the intentions of the user expressed through that interface.

Figure 2:
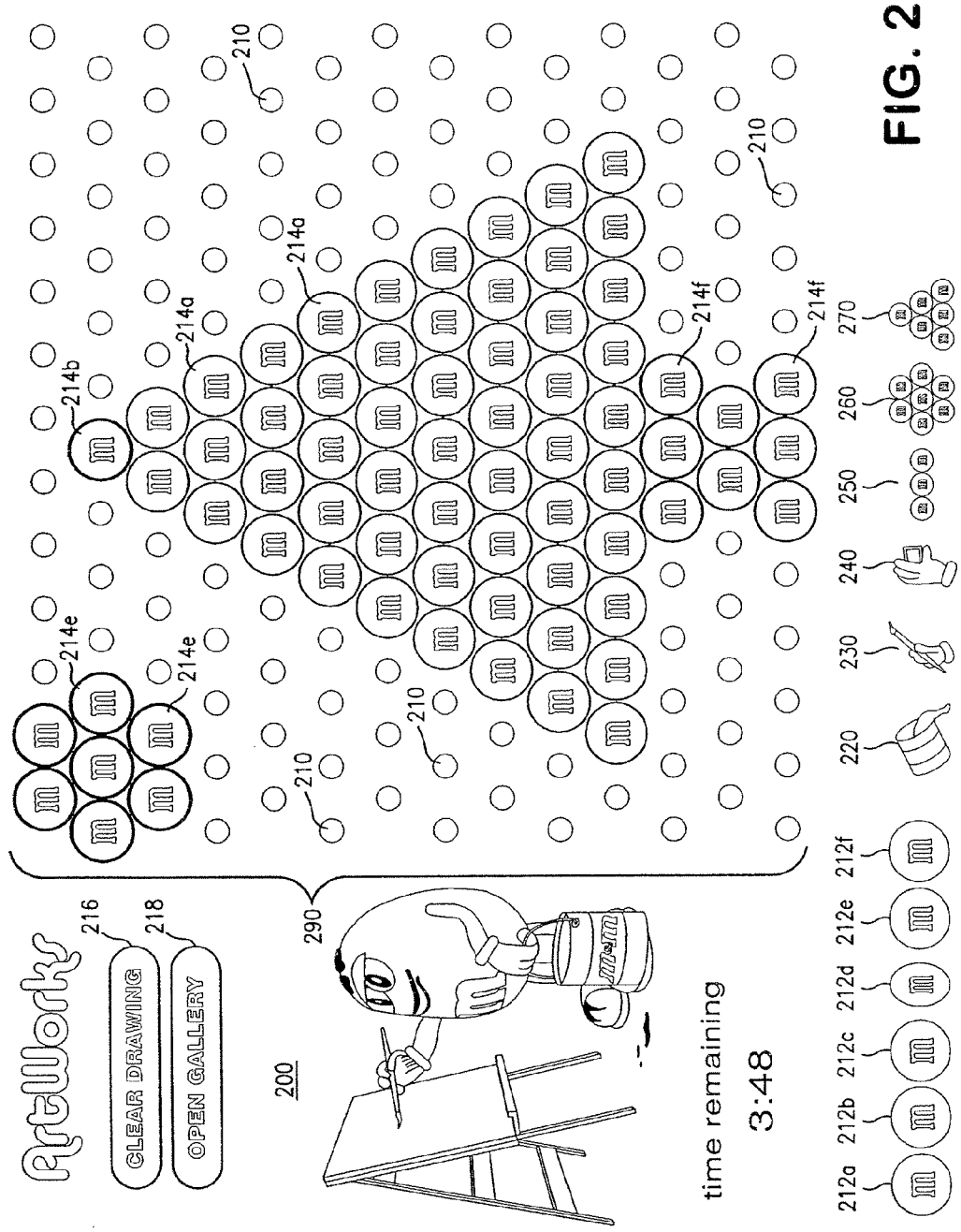
FIG. 2 illustrates one example of a graphical user interface which may be used in an embodiment of the invention.

FIG. 2 is an example of a graphical user interface 200, displayed on display 112, according to the present invention.

The screen includes a grid 290 of points 210, which correspond to the positions of confectionary pieces to be placed on the substrate. In this embodiment, the grid 290 is staggered with thirteen columns and fourteen rows. A Christmas tree is drawn on grid 290, comprised of unactivated points 210, and activated points 214a, 214b, 214e, and 214f (which represent colors corresponding to color buttons 212a, 212b, 212c, and 212f, respectively). A user selects, using the touch of a finger on the touch screen, any one of color buttons 212a-212f (green, yellow, red, blue, orange, and brown, respectively). Once a color button 212 is selected, a user may touch any point 210 on grid 290 to cause the chosen color to be displayed at that point. As necessary, the user may alternate the color selection by choosing other buttons 212.

Interface 200 also includes drawing tools 220-270. Drawing tool 220 is a fill-in tool. When selected, a user may touch an area defined by a boundary of previously selected points to fill in the points 210 within the boundary with a selected color chosen from color buttons 212. For instance, if the user has already drawn a square of red confectionary pieces, the user may select button 212d and tool 220 to activate a blue color fill-in feature. Then, by touching anywhere within the square, all the points within the boundary will be changed to blue. Drawing tool 230 is a free-hand tool which allows the user to drag his finger across the screen to provide the selected color at each of the points along the finger's path. Drawing tool 240 is an erase feature which allows a user to erase colors, such as activated colors 214f, already displayed at selected points. In preferred embodiments, the beginning default setting of the interface 200 shows all of the points 210 of grid 290 as yellow confectionary pieces. Thus, the user can choose drawing tool 240 to choose to erase specific sections of the grid 290 so as not to include confectionary pieces at particular points 210. Drawing tool 250 is a line drawing tool which allows the user to press a finger on one point of the touch screen, corresponding to a point 210, and then drag the finger to another point on the touch screen. Once the finger is released from the screen at the second point, the drawing tool 250 will automatically provide a substantially straight line of the selected color at all points 210 between the starting and ending point of the user's finger. Drawing tool 260 is a circle drawing feature. Once a user chooses drawing tool 260, he may place his finger at a given point 210 on the grid 290 to define a center of the circle. Then, as the user drags his finger out from the defined center position, the radius of the circle is expanded to the point of the user's finger. Once the user releases his finger, drawing feature 260 defines the circle with the selected color at each of the points within the boundary of the circle. Drawing tool 270 is a triangle drawing feature. With this drawing tool, the user may place his finger at a point 210 on grid 290 to select the top apex of an equilateral triangle. As the user drags his finger down across the screen, the size of the triangle increases. Once the finger is released from the screen, the drawing tool 270 fills in all of the points 210 in the defined triangle with the selected color.

Timer 280 provides the user with a count down of time, after which the application is timed out. Clear button 216 clears the drawing from the screen to allow the user to start over.

Gallery button 218 opens a gallery of predefined patterns from which the user can select predetermined designs to use as the final confectionary image, or edit as the user wishes.

Figure 3:
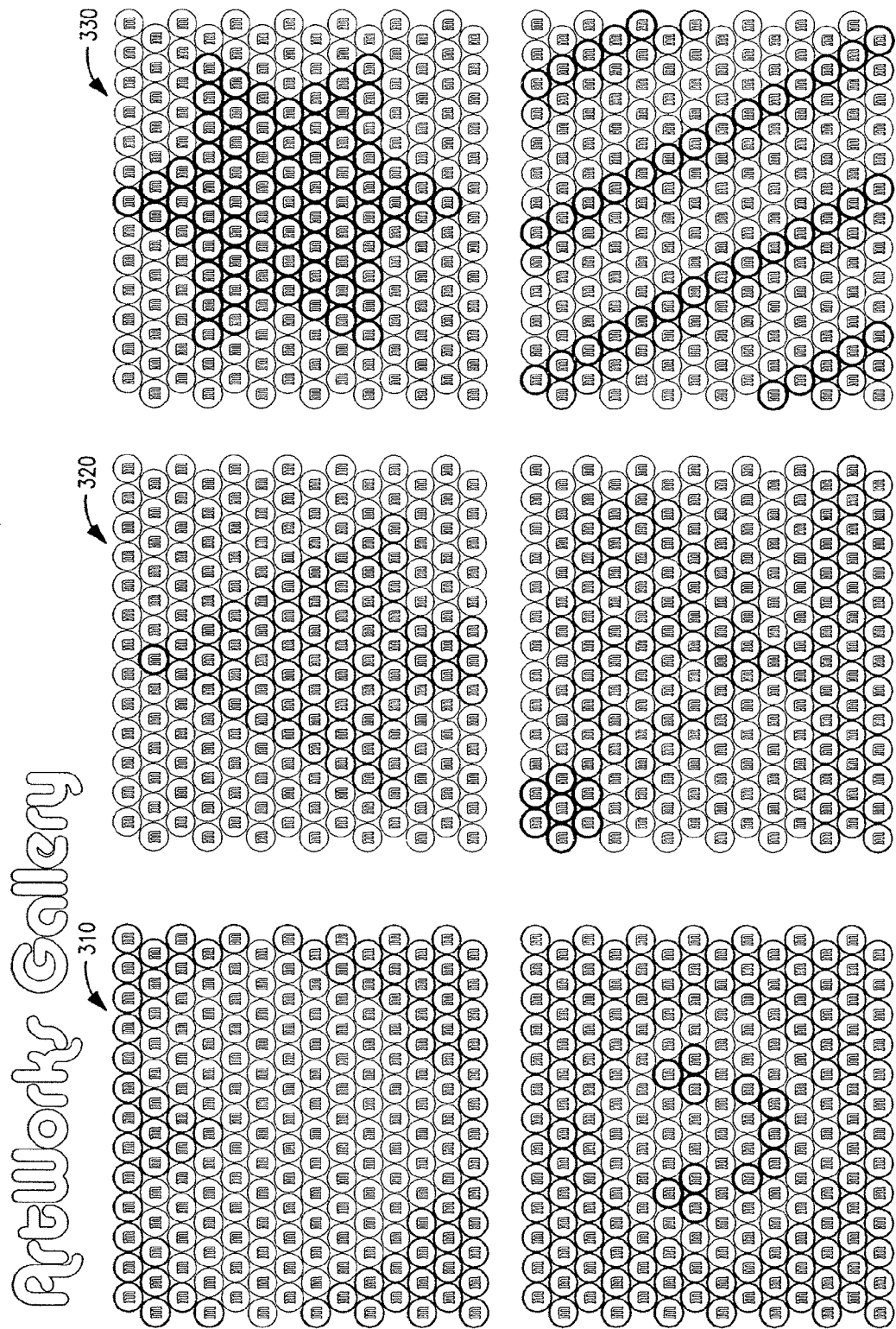
FIG. 3 illustrates yet another example of a graphical user interface which may be used in an embodiment of the invention.

FIG. 3 is an example of a gallery 300 which includes, for instance, a predefined image 310, illustrating a heart shape, a predefined image 320, illustrating a Christmas tree design, and a predefined image 330, illustrating a Star of David design, among others (including a pumpkin, a tree, and a rainbow design).

As discussed above, however, user interface 200 and gallery 300 are only examples of user interfaces and drawing programs that may be used to implement an embodiment of the present invention. Other drawing programs, whether pixilated grids or free-form drawing applications, may be used to construct the pattern to be formed with confectionary pieces on the substrate.

Production System

Arrangement area 120, in the embodiment depicted in FIG. 1, is a structure which includes robot 130, containers 124a-f, substrate support 144, escapement trays 126, and tracks 146a and 146b. Preferably, arrangement area 120 is enclosed, so as to maintain a sanitary work environment. In this embodiment, clear walls 122 (formed of glass, polycarbonate, or the like) are provided as a part of the enclosure for arrangement area 120, so as to allow users to view the operation of robot 130, and to allow administrators to monitor potential problems in the operation thereof.

Robot 130 may be any automated device that receives computer instructions for assembly of the confectionary product, and automatically arranges the confectionary pieces in accordance with the received instructions. In the embodiment shown in FIG. 1, robot 130 includes a robot controller (internal to the depicted robot 130), a robotic arm 132, and vacuum suction tip 134. The robot controller may be any computer, processor, or the like, which receives instructions from the computer processor (corresponding to the information input by a user through the graphical user interface) and controls robotic arm 132, or like device, to carryout the operations designated by the instructions. Options for the software and hardware for a robot controller are known by those of ordinary skill in the art and, in some cases, commercially available.

Robotic arm 132 carries out the operations instructed by a robot controller so as to arrange the confectionary pieces in the pattern defined by the user through interface station 110. In achieving this end, robotic arm 132 preferably includes a vacuum suction tip 134. The vacuum suction tip is able to retrieve confectionary pieces through vacuum suction. Vacuum suction tip 134 may include a vacuum switch such that, when a confectionary piece is grasped by the suction force of vacuum suction tip 134, the switch is tripped to alert the robot controller that a confectionary piece has been retrieved by robotic arm 132. In addition, the vacuum switch could prevent robotic arm 132 from retrieving damaged confectionary pieces, which would not activate the vacuum switch. In other embodiments, however, alternate mechanism may be used by robotic arm 132 to retrieve confectionary pieces. In particular, confectionary pieces may be grasped by finger-like tools on robotic arm 132, or any one of a member of other mechanical means. Also, multiple tools may be provided on one robotic arm.

Robotic arm 132 is only one example of a movable robotic system that operates to execute the mechanical activities necessary to arrange the confectionary pieces in the defined pattern on the substrate. Other movable robotic systems may be used to achieve this end. For example, in other embodiments, a movable robotic system may include a robotic arm having a magazine or other storage means from which confectionary pieces are automatically fed to a tip of the arm and dispensed. In this manner, the "retrieval" of the confectionary pieces from the container involves the sheparding of the confectionary pieces from the storage means to the dispensing area of the arm. Furthermore, the movable robotic system may be designed in such a way that the dispensing system for retrieving and dispensing confectionary pieces is stationary, and the movable structures of the system operate to move the substrate relative to the dispensing system. Other combinations of these features, and similar ideas, may be employed for the robotic system of the invention.

In the present embodiment, to complement the robotic arm 132, the confectionary pieces are stored in containers 124a-f. In some embodiments, only one container 124 may be provided. Preferably, a plurality is used. Most preferably, three or more containers are used. Containers 124 may take any one of a number of forms. Containers 124 may be replaceable cartridges or refillable structures that are semi-permanently connected to arrangement area 120. The confectionary pieces stored therein may also take any one of a number of forms. Preferably, the containers 124a-f have clear wall portions, so that an administrator or user can see when a supply of confectionary pieces is getting low. Alternatively, a detector may be provided to detect when the level of confectionary pieces has dropped below a threshold level. The detector can alert an administrator to the low level by activation of a light on arrangement area 120, or through other suitable means. In other embodiments the level of confectionary pieces can be monitored by automatically tracking the number of confectionary pieces retrieved from an individual container 124.

In preferred embodiments, the confectionary pieces are pellet-like candies having a relatively uniform shape (e.g., oval, round, or lenticular), such as sugar-shelled candies or jellybeans. For instance, M&Ms® MINIS® Milk Chocolate Candies, SKITTLES® Bite-Size Candies, or STARBURST® Jellybeans may be used. Preferably, the dimensions of the confectionary pieces are in the range of about 7 mm×4 mm to about 20 mm×20 mm, although other sizes may be used. In other embodiments, confectionary pieces of other shapes or sizes may be used. For instance, bite-sized candy bars, still in their wrappers, may be selected for the confectionary pieces. It is preferable, however, that the confectionary pieces be pellet like and small in size. It is also preferable that the confectionary pieces be multicolored and substantially uniform in shape. Further, if a logo is to be provided on the pieces, it is preferable that it be provided on two sides (or more, depending on the shape), so that a copy of the logo faces the customer when placed in the substrate.

In the embodiment shown in FIG. 1, containers 124a-f are hopper-like devices which dispense the confectionary pieces at or near the bottoms of the containers, in this case, into escapement trays 126, or other confectionary discharge holder. Escapement trays 126 each have a retracted position, shown by escapement tray 126a, and an extended position, shown by escapement tray 126b. As shown with respect to escapement tray 126b, depressions 128 are provided on the surface of that tray. Each depression 128 is adapted to receive and cradle a single confectionary piece for retrieval by vacuum suction tip 134. In the retracted position, depressions 128 are positioned under an opening in a container 124. This causes confectionary pieces to fall onto trays 126 and into depressions 128 formed thereon. The escapement trays 126 are moved into the extended position, from the retracted position, through an opening which causes all of the confectionary pieces, except for those individual pieces positioned in each of depressions 128, to remain in containers 124. In alternative embodiments, a scraper device may be provided to scrape all but the individual pieces in the depressions 128 from the escapement tray 126 before it is moved to its extended position. In the extended position, as shown with respect to escapement tray 126b, individual confectionary pieces are provided in each of depressions 128 and exposed for retrieval by robotic arm 132.

Preferably, each different container 124 includes confectionary pieces of a different color. Consequently, depending on the instructions from graphical user interface, robotic arm 132 can position vacuum suction tip 134 over an escapement tray containing confectionary pieces of the particular color needed for the next placement position on the substrate. Specifically, vacuum suction 134 may be positioned over one of the depressions 128 and vacuum pressure may be applied to suction the confectionary piece positioned in the specific depression 128 until that confectionary piece is gripped by vacuum suction tip 134. The gripping of a confectionary piece on the vacuum suction tip 134 operates, in preferred embodiments, to trip a vacuum switch, which informs the robot controller that the confectionary piece has been retrieved.

Escapement trays 126 may be moved from the extended to the retracted position as necessary to refill depressions 128 with confectionary pieces. In that regard, the movement of the escapement trays may be achieved by manual operation by an administrator or automatic operation by motors provided in arrangement area 120 (which may be included as part of the operation, and potentially structure, of robot 130). Furthermore, this operation may be controlled by the computer processor or robot controller based on determinations of when confectionary pieces have been removed from each depression 128 in a given escapement tray 126, which can be achieved by tracking actions of robotic arm 132 with respect to the various trays 126. Alternatively, detectors may be provided to detect when the depressions 128 have been emptied.

It is also noted that robotic arm 132 may include a camera, not shown, which may be used to detect colors of confectionary pieces, so that the robot can discern and retrieve a specific color confectionary piece without reference to the specific container in which it is stored. With the use of such a camera, separate containers 124 may not be necessary, inasmuch as the camera may be used to select different colors from a single container, conveyor belt, or the like. Furthermore, in other embodiments, confectionary discharge holders such as escapement trays 126 may be removed in lieu of an alternative mechanism for retrieving confectionary pieces from one or more containers. For instance, the robotic arm 132 may position the vacuum suction tip 134, or other retrieval implement, directly in an opening in a container 124 to retrieve a confectionary piece.

Once the proper confectionary piece is retrieved, robotic arm 132 positions the confectionary piece over an area of the substrate at which it is to be placed, in accordance with the instructions based upon the user-defined pattern. This process can be arranged in an orderly manner in which robot 130 attends, preferably in order, to each address of the grid, which may be defined by a simple coordinate system.

Arrangement area 120 includes tracks 146a and 146b on which are mounted substrate support 144. Substrate support 144 is movable along tracks 146a and 146b between an extended position, shown in FIG. 1, at which a user can place a substrate 140 on substrate support 144, and a retracted position at which substrate support 144 positions substrate 140 in position for access and/or manipulation by robot 130. The movement of substrate support 144 may be achieved manually or automatically.

Substrate 140 may be any one of a number of materials. In a preferred embodiment, shown in FIG. 1, a jewel case (typically for CD's) is used as the substrate, or a holder for the substrate (e.g., the substrate may be positioned in the jewel case). It is apparent that many other types of containers may be used as the holder for the substrate. Any one of a number of plastic materials, preferably translucent or clear, or the like is preferred for the substrate and/or container. The container may be partially or wholly made of the translucent or clear material. If the container is partially made of such material, the translucent or clear material is preferably positioned so as to maximize visual display of the confectionary pieces. In some embodiments, the translucent or clear material is UV resistant, to prevent fading of the colors of the confectionary pieces. A cover may also be provided to enclose and/or secure the pieces once the design is complete. Preferably, in the jewel case, or other substrate, depressions are formed in which individual confectionary pieces may be situated, so as to maintain the placement of the confectionary pieces in their designated positions when the case is closed. Thus, the cover of the case may trap the pieces in their respective depressions. In other embodiments, the substrate (or a portion thereof) may be deformable, such as a material which is elastic, sponge-like, has shape-memory characteristics, or otherwise gives to the application of pressure to form depression therein. When using such a substrate, the cover may come into contact with the confectionary pieces when closed such that, when fully closed, the cover presses the pieces into the substrate, trapping them against the substrate.

In preferred embodiments using pre-formed depressions, the depressions are semi-spherical dimples on the surface of the substrate. More preferably, the depressions will conform to the shape of the confectionary pieces. The dimples may be formed in a grid which mimics the grid displayed in the user interface. Thus, the grid may be staggered or aligned and preferably has dimples defining a grid of 13×14 or 13×11, when the size of a jewel case. The size of the substrate may vary depending on design preferences. Preferred sizes include those in the range of about 100 to 2,000 mm, but preferably about 100 to 1,500 mm, and more preferably about 100 to 1,000 mm. Thus, it is preferred that the substrate may vary from the size of a business card to the size of a poster. For a business card size, the substrate is preferably about 50×90 mm. When the size of a jewel case, the dimensions are preferably 125×140 mm. Another preferred size is about 350×350 mm.

It is preferred that robotic arm 132 place the confectionary pieces in the desired pattern in order, one row (or column) at a time. In so doing, with each new row, it is preferable that the vacuum suction tip 134 release the grasped confectionary piece above the corresponding depression in the substrate 140 at a position off center, closer to the empty row than the filled row. The measurement of "off center" may be about 0.25 to 1.25 mm. Preferably, the range is about 0.25 to 0.75. More preferably, offset is about 0.5 mm. In so doing, the released confectionary piece is less likely to disturb confectionary pieces in depressions of an adjacent row and it has been found that the confectionary pieces settle into the depressions more aptly. Furthermore, with the preferred lenticular shape of the confectionary pieces, it is preferred that the depressions on the substrate have a semi-spherical shape so as to cradle the lenticular shape of the confectionary pieces. Also, in other embodiments, the pieces may be placed on the substrate one color at a time, rather than position-by-position and row-by-row.

In addition, in the present embodiment, a top cover of the jewel case 142 is provided so that it can be closed over the substrate, once the robotic arm 132 has positioned all of the confectionary pieces in the desired pattern. In so doing, the confectionary pieces may be secured in their positions on the substrate, allowing for ease of transport.

In alternative embodiments, other substrates may be used. Furthermore, the substrate may be edible, such as a chocolate sheet. The substrates 140 may be stored in a substrate storage bin 148, and loaded onto the substrate support 144 as needed, by a user or an administrator. Automatic loading is also contemplated.

Operation

Figure 4:
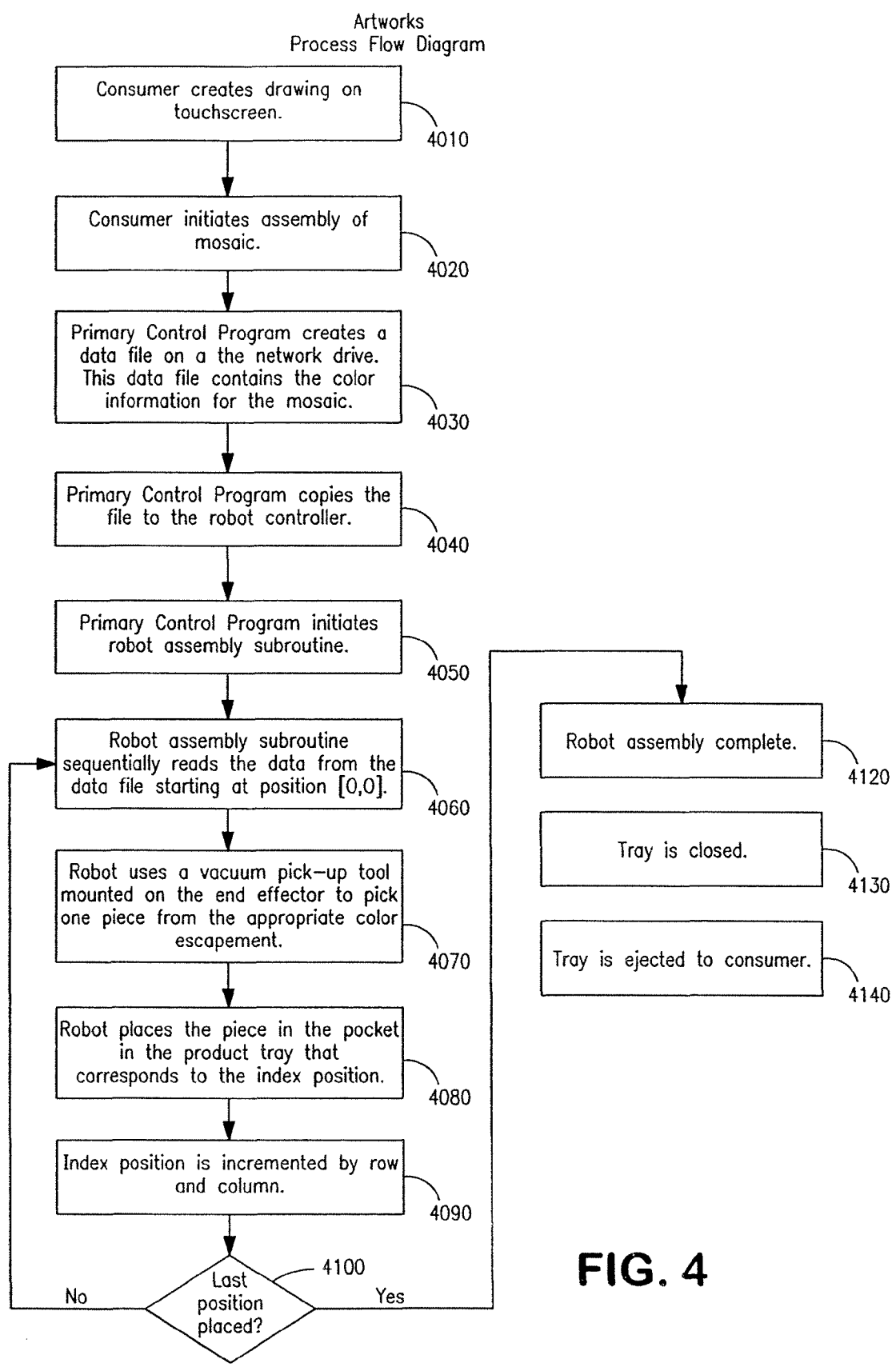
FIG. 4 is a flow diagram illustrating steps of a method according to a preferred embodiment of the invention.

FIG. 4 shows a flow diagram of a method for operating a confectionary image design system as described above. In step 4010, a consumer creates a drawing on the touch screen, or other user interface. In step 4020, the consumer initiates assembly of the pattern of confectionary pieces by confirming the design and providing payment for the finished product. In step 4030, a control program on the computer creates a data file, which data file contains the color information for the pattern defined by the customer. In step 4040, the control program is provided to the robot controller. In step 4050, the control program initiates a robot assembly subroutine. In step 4060, the robot assembly subroutine sequentially reads data from the data file starting at a position on the grid of [0, 0]. In step 4070, the robot retrieves one piece from the appropriate color escapement tray. In step 4080, the robot places the retrieved piece in the depression on the substrate that corresponds to the indicated position. In step 4090, the index position is incremented by row and column. In step 4100, it is determined whether the last position of the design has been completed. If the answer is no, the method returns to step 4060, so that the robot assembly may attend to the next position on the grid. If the last position has been filled in accordance with the user's design, the method proceeds to step 4120, at which point the robot assembly subroutine is completed. In step 4130, the cover for the substrate tray is closed, and at step 4140 the substrate tray including the substrate is ejected to the consumer.

With such an operation, the process can be completed while the customer waits. Preferably, the final product is dispensed within 10 minutes of the user completing the design, and more preferable, within 7 minutes of the design completion (i.e., once the user finishes and submits the design for production, assuming no other jobs are queued), and most preferably, within 5 minutes. When ordered remotely, it is preferred that the product be shipped to the customer within 10 days of submission of the request, more preferably within 7 days, and most preferably, within 4 days.

While the various embodiments of the present invention have been described above, it should be understood that they have been presented by way of example, and not limitation. It will be apparent to persons skilled in the relevant art that various changes in form and detail can be made therein without parting from the spirit and skill of the present invention. In addition, it should be understood that the figures and screen shots illustrated in the attachments, which highlight the functionality and advantages of the present invention, are presented for example purposes only. The architecture of the present invention is sufficiently flexible and configurable, such that it may be utilized in ways other than shown in the accompanying figures.

Furthermore, the present invention has been described, in some examples, as a method of providing and operating various computer-controllable elements (robots, displays, etc.). It should be appreciated that methods in accordance with the present invention can be embodied in computer programs and stored on computer-readable media. In such cases, the present invention shall include the programs and media storing such programs for instructing a computer, or computers, to perform the steps of the methods according to the invention.

We claim:

1. A confectionary image design system, comprising:
   a display adapted to display a graphical user interface through which a user defines a pattern of confectionary pieces to be arranged on a substrate;
   a computer processor adapted to control the graphical user interface through which the user defines the pattern, and to provide instructions for arranging the confectionary pieces in the defined pattern;
   a plurality of containers adapted to retain the confectionary pieces used to form the defined pattern, with each container of the plurality of containers holding confectionary pieces of a different color; and
   a robot comprising a robotic production system and a robot controller, the robot controller receiving from the computer processor the instructions for arranging the confectionary pieces and controlling the robotic production system to retrieve the confectionary pieces stored in the plurality of containers and arrange the pieces on the substrate in the pattern defined by the user.

2. The confectionary image design system according to claim 1, wherein the confectionary image design system is a stand-alone kiosk.

3. The confectionary image design system according to claim 1, wherein the computer processor communicates with the robot controller over a computer network.

4. The confectionary image design system according to claim 1, wherein the user defines the pattern by selecting points on a grid displayed in the graphical user interface, with the selected points on the grid corresponding to placement of the confectionary pieces on the substrate.

5. The confectionary image design system according to claim 4, wherein the substrate comprises depressions arranged in a grid corresponding to the grid displayed on the graphical user interface, and
   wherein the robot controller controls the robotic production system to place individual confectionary pieces in the depressions in a pattern corresponding to the selected points on the grid displayed on the graphical user interface.

6. The confectionary image design system according to claim 5, wherein the robotic production system comprises a movable robotic arm and a vacuum, and the robotic arm retrieves individual confectionary pieces stored in the plurality of containers through vacuum suction supplied by the vacuum.

7. The confectionary image design system according to claim 1, wherein the user selects colors to be used in the pattern from different color options provided in the graphical user interface, which color options correspond to the different colors of the confectionary pieces of the plurality of containers, and wherein the robotic production system retrieves the different color confectionary pieces from the plurality of containers based on the user's color selections.

8. The confectionary image design system according to claim 7, wherein the user defines the pattern by selecting points on a grid displayed on the graphical user interface and a color to be displayed at each selected point, with the points corresponding to positions on the substrate at which confectionary pieces of the selected colors are to be placed by the robotic production system.

9. The confectionary image design system according to claim 1, wherein the computer processor comprises an associated memory storing preset images which the user can select using the graphical user interface in defining the pattern.

10. The confectionary image design system according to claim 1, further comprising an interface for uploading images to the computer processor for use in defining the pattern.

11. The confectionary image design system according to claim 1, wherein the substrate is plastic and includes a clear cover for retaining the confectionary pieces in place when closed.

12. The confectionary image design system according to claim 1, wherein the robotic production system retrieves confectionary pieces from at least one confectionary discharge holder adapted to receive confectionary pieces from at least one of the plurality of containers.

13. A method of designing and arranging a pattern of confectionary pieces on a substrate, the method comprising the steps of:

accepting, through a graphical user interface which allows a customer to define a pattern of confectionary pieces to be arranged on the substrate, data corresponding to the customer-defined pattern;

using a computer processor to provide instructions based upon the accepted data;

receiving at a robot controller the provided computer instructions; and operating a robotic production system, using the robot controller and in accordance with the computer instructions, to arrange confectionary pieces on the substrate in the customer-defined pattern, wherein the user selects colors to be used in the pattern from different color options in the graphical user interface provided in the accepting step, which color options correspond to different color confectionary pieces, and wherein, in the operating step, the robotic production system arranges the different color confectionary pieces based on the user's color selections.

14. The method according to claim 13, wherein all of the steps are performed at a kiosk in a single location.

15. The method according to claim 13, wherein information concerning the customer-defined pattern is transmitted over the Internet for implementation by the robotic production system.

16. The method according to claim 13, wherein the accepting step comprises a sub-step of providing a graphical user interface in which the user defines the pattern by selecting points on a grid displayed in the graphical user interface, with the selected points on the grid corresponding to placement of the confectionary pieces on the substrate.

17. The method according to claim 16, wherein the substrate comprises depressions arranged in a grid corresponding to the grid displayed on the graphical user interface, and wherein, in the operating step, the robot controller controls the robotic production system to place individual confectionary pieces in the depressions in a pattern corresponding to the selected points on the grid displayed on the graphical user interface.

18. The method according to claim 13, wherein the accepting step comprises a sub-step of providing a memory storing preset images which the user can select using the graphical user interface in defining the pattern.

19. The method according to claim 13, wherein, in the operating step, the robotic production system retrieves confectionary pieces from at least one confectionary discharge holder adapted to receive confectionary pieces from at least one container.

20. A confectionary image design system, comprising:

a display adapted to display a graphical user interface through which a user defines a pattern of confectionary pieces to be arranged on a substrate;

a computer processor adapted to control the graphical user interface through which the user defines the pattern, and to provide instructions for arranging the confectionary pieces in the defined pattern;

at least one container adapted to retain the confectionary pieces used to form the defined pattern; and a robot comprising a robotic production system and a robot controller, the robot controller receiving from the computer processor the instructions for arranging the confectionary pieces and controlling the robotic production system to retrieve the confectionary pieces stored in the at least one container and arrange the pieces on the substrate in the pattern defined by the user, wherein the user defines the pattern by selecting points on a grid displayed in the graphical user interface, with the selected points on the grid corresponding to placement of the confectionary pieces on the substrate.

* * * * *